3,489,659
PROCESS FOR LITHIDING
Newell C. Cook and Craig S. Tedmon, Jr., Schenectady, N.Y., and William C. Hagel, Denver, Colo., assignors to General Electric Company, a corporation of New York
No Drawing. Filed July 3, 1967, Ser. No. 650,626
Int. Cl. C23b 5/30; B23p 3/00
U.S. Cl. 204—39          9 Claims

ABSTRACT OF THE DISCLOSURE

A lithide coating is formed on a metal composition in which lithium is soluble by forming an electric cell having said metal composition as the cathode joined through an external electrical circuit to either a carbon or lithium anode in a specified fused salt electrolyte at a temperature of at least 500° C. but below the melting point of said metal composition in the substantial absence of oxygen using a current density not exceeding 10 amperes/dm.$^2$. This process is useful, therefore, for producing a lithided surface on these substrates.

---

This invention relates to a method for lithiding a base metal composition. More particularly, this invention is concerned with an electrolytic process whereby a base metal composition is employed as a cathode in a fused salt bath electrolyte containing lithium fluoride and employing a carbon or lithium metal anode and a current passed through the anode to the bath to the cathode whereby lithium metal is desposited on said base metal cathode and diffuses into the surface of the base metal cathode. The base metal materials which are lithided in accordance with this disclosure have been found to be more resistant to high temperature oxidative degradation and therefore, can be used in the production of alloys which need better resistance to high temperature oxidative degradation, for example, chrome-stainless-steel. It has been found that chromium when treated in accordance with the process of this disclosure is extremely resistant to oxidation, particularly at high temperatures.

It is an object of this invention to provide a process whereby base metal compositions can be treated with lithium, whereby the lithium diffuses into the base metal surface to provide excellent oxidative resistance.

In accordance with the process of this invention, a carbon or lithium metal anode is immersed in, or brought into contact with, a fused salt bath composed essentially of a member of the class consisting of lithium fluoride and lithium fluoride mixed with the remaining alkali metal fluorides or with the alkaline earth metal fluorides; the amount of lithium fluoride in such used salt bath being at least 0.01%, by weight. A cathode composed of the metal to be lithided is inserted in said fused salt bath. It has been found that when lithium is employed as the anode that the combination is an electric cell in which an electric current is generated when an electrical connection, which is external to the fused bath, is made between the cathode and the lithium anode. Under such conditions, the lithium dissolves as an ion in the fused salt bath and lithium metal is deposited on the base metal cathode and diffuses into the surface layers of said base metal cathode. The lithium metal diffuses into and may react with the base metal to form a lithide coating.

When a carbon anode is employed in the process of this invention, it is necessary that an external electromotive force be applied in order to lithide the base metal cathode. For reasons hereinafter set forth, it is desirable to apply additional E.M.F. even when a lithium metal anode is employed.

In the specification and claims, the term "lithiding" is employed to designate any solid solution or alloys of lithium with the base metal regardless of whether the base metal does or does not form an intermetallic compound with lithium in definite stoichiometric proportions which can be represented by a chemical formula.

When lithiding is being performed, it is desirable that the rate of deposition of the lithium be regulated so that the rate of deposition is equal to the rate of diffusion of the lithium into the base metal cathode. A few metals such as palladium and platinum have high solubilities for lithium forming definite stoichiometric compounds. For such materials, when using either lithium anodes or carbon anodes, the deposition rate can be decreased by inserting some resistance in the circuit, if a slower rate is desired than that produced by the battery action. A faster rate can be obtained by increasing the voltage applied to the circuit by supplying additional E.M.F. from an outside source.

The fused salt baths which can be used in accordance with the process of this invention include pure lithium fluoride or the fluorides of other alkali metals or alkaline earth metals mixed with lithium fluoride. It is often preferred to employ pure lithium fluoride as the fused salt for simplicity of operation.

The chemical composition of the fused salt bath is critical if good lithide coatings are to be obtained. The starting salt should be as anhydrous and as free of all impurities as is possible or should be easily dried or purified by simply heating during the fusion step. Because oxygen frequently interferes, lithiding should be carried out in the substantial absence of oxygen. Thus, for example, the process can be carried out in an inert gas atmosphere or in a vacuum. By the term "substantial absence of oxygen" it is meant that neither atmospheric oxygen nor oxides of metals are present in the fused salt bath. The best results are obtained by starting with reagent grade salts and by carrying out the process under vacuum or an inert gas atmosphere, for example, in an atmosphere of nitrogen, argon, helium, neon, krypton or xenon.

It has been found that even commercially available reagent grade salts must often be purified further in order to operate satisfactorily in the process. This purification can be readily done by utilizing scrap metal articles as the cathodes and carrying out the initial lithiding runs with an additional applied voltage, thereby plating out and removing from the bath those impurities which interfere with the formation of high quality coatings.

The base metals which can be lithided in accordance with the process of this invention include the metals in which lithium has a definite though limited solubility. These metals are, for example, chromium, cobalt, nickel, copper, iron, manganese, palladium, silver, platinum and gold. Alloys of these metals with each other or alloys containing these metals as a substantial constituent, that is, over 1 mole percent, can also be lithided in accordance with the process, providing the melting point of the metal or the resulting alloy is not lower than the temperature at which the fused salt bath is being operated.

The lithiding procedure of this invention has proved extremely useful when applied to metals which oxidize to p-type semiconducting oxides. Such metals are, for example, $Cr(Cr_2O_3)$, $Co(CoO)$, $Ni(NiO)$, $Cu(CuO)$, $Fe(FeO)$ and $Mn(MnO)$. It has been found that when such metals are lithided and then exposed to high temperatures (i.e., greater than 600° C.), in an oxidizing atmosphere, the metals are protected from extreme oxidative degradation which the metal undergoes without the lithide coating.

In order to produce a reasonably fast deposition rate and to insure the diffusion of the lithium into the base metal to form a lithide coating, it has been found desirable to operate the process at a temperature of from about 500°–1100° C. It is usually preferred to operate at temperatures of from 600°–1000° C.

The temperature at which the process of this invention is conducted is dependent to some extent upon the particular fused salt bath employed. Thus, for example, when temperatures no lower than 850° C. are desired, pure lithium fluoride can be employed and when temperatures no lower than 675° C. are desired, an eutectic of sodium and lithium fluoride can be employed. Inasmuch as the preferred operating range is from 600° C.–1000° C., the eutectic of lithium and potassium fluorides and the eutectic lithium, sodium and potassium fluorides as the fused salt can also be employed.

As has been set forth above, a carbon or lithium metal anode may be employed in the process of this invention. When lithium metal is employed as the anode, it will be in liquid form and will have to be contained on the surface of the fused salt bath by a tubular container such as iron, stainless steel or Monel. The solubility of lithium in these metals is always small and in no way interferes with the accompanying electrolytic lithiding. This is possible since lithium metal has a lower density than the fused salt bath and will float on the surface of the bath.

It is often a distinct advantage of the instant process to be able to measure the amount of current flowing with an ammeter which enables one to readily calculate the amount of lithium being deposited on the base metal cathode and being diffused into the metal surface. In such cases by knowing the area of the article being plated, and the diffusion characteristics of lithium into the metal, it is possible to calculate the thickness of the lithide coating formed, thereby permitting accurate control of the process to obtain any desired thickness of the diffusion layer.

Although when a lithium anode is employed, the process operates very satisfactorily without impressing any additional electromotive force on the electrical circuit, it has been found possible and often advantageous to apply a small voltage when it is desired to obtain constant current densities during the reaction, and to increase the deposition rate of the lithium without exceeding the diffusion rate of the lithium into the base metal cathode. The additional E.M.F. should not exceed 1.0 volt and preferably should fall between 0.1 and 0.5 volt. When a carbon anode is employed, it is, of course, essential that an electromotive force be applied. In such instances the E.M.F. can be in the range of from 0.1 to 4.0 volts and preferably is in the range of from 0.1 to 2.5 volts. When a carbon anode is employed, tetrafluoromethane is produced as a by-product at the anode.

Since the diffusion rate of lithium into the cathode article varies from one material to another, with temperature and with the thickness of the coating being formed, there is always a variation in the upper limits of the current densities that may be employed. Therefore, the deposition rate of lithium should always be adjusted so as not to exceed the diffusion rate of the lithium into the substrate material, if high efficiency and high quality diffusion coatings are to be obtained. The maximum current density for good lithiding is about 10 amperes/dm.$^2$, when operating within the preferred temperature ranges of this invention. Higher current densities can be used but in addition to the formation of a lithide coating, excess lithium is formed which because of its low melting point (186° C.) rises to the surface of the salt.

If an applied E.M.F. is used, the source, for example, a battery or other source of direct current, should be connected in series with the external circuit so that the negative terminal is connected to the external circuit, terminating at the metal being metallided, and the positive terminal is connected to the external circuit terminating at the anode. In this way, the voltages of both sources are algebraically additive.

As will be readily apparent to those skilled in the art, measuring instruments such as voltmeters, ammeters, resistances, timers, etc., may be included in the external circuit to aid in the control of the process.

Because the adherent oxidative resistance properties of the lithide coatings are uniform over the entire treated area, the lithided compositions prepared by the process of this invention have a wide variety of uses. They can be used to fabricate vessels for high temperature chemical reactions, to construct ovens and other articles requiring oxidative resistant surfaces. Other uses will be readily apparent to those skilled in the art as well as other modifications and variations of the present invention in light of the above teachings.

The following examples serve to further illustrate the invention, all parts being by weight, unless otherwise expressly stated.

Example 1

Lithium fluoride (25 pounds) was charged into an Inconel liner (5¾" diameter x 17¾" deep) that was then fitted into a steel pot (6⅜" diameter x 18" deep). The pot was fitted with a nickel plated steel flanged lid which contained a water channel for cooling, two ports (2¼" in diameter) for glass electrode towers and two 1" ports for a thermocouple probe and a vacuum connection or gas bubbler. The whole apparatus was encased in an electrical furnace for heating. A vacuum was pulled on the cell and the salt melted and then argon was introduced into the cell.

With a carbon anode (¼" diameter) immersed in the salt through the anode tower and a chromium disc immersed in the salt through the cathode tower, the following lithiding data was obtained at 900° C.

TABLE I

| Time (min.) | Volts, anode polarity | Current density, amps/dm.$^2$ | |
|---|---|---|---|
| 0 | +0.37 | 0 | |
| 1 | +2.36 | 3.1 | Current on. |
| 2 | +2.54 | 3.1 | |
| 10 | +2.52 | 3.1 | |
| 11 | +1.0 | 0 | Current off. |

The sample, on being withdrawn from the salt was dark, had a grainy appearance, and had gained 0.5 mg. of a theoretical 4.1 mg. (calc. on the basis of a valence change of 1; $Li+ \rightarrow Li°$).

Another sample of chromium lithided at 1100° C. as follows:

TABLE II

| Time (min.) | Volts, anode polarity | Current density, amps/dm.$^2$ | |
|---|---|---|---|
| 0 | +0.23 | 0 | |
| 1 | +0.59 | 2.5 | Current on. |
| 4 | +0.92 | 2.5 | |
| 10 | +0.93 | 2.5 | Current off. |
| 11 | +0.75 | 0 | |

The sample was also bright and grainy and had gained 0.4 mg. of a theoretical 3.6 mg.

Example 2

Employing the cell and procedure described in Example 1, a series of runs were made employing different metals as cathodes. The test data as well as the results of these runs are given in the following table:

TABLE I.—OPERATING DATA AND RESULTS FOR VARIOUS CATHODES

| Cathode material | Electrolyte temp. (° C.) | Current density, (A/dm.²) | Potential difference (volts) | Time (min.) | Cathode, wt. gain (mg.) | Coulometric efficiency (percent) |
|---|---|---|---|---|---|---|
| Cu | 925 | 1.0 | 1.2 | 15 | 0.8 | 10.0 |
| Pt | 1,000 | 2.8 | 1.7 | 20 | 8.6 | 100 |
| Cr | 900 | 3.1 | 2.52 | 10 | 0.5 | 12.2 |
| Cr | 900 | 3.1 | 2.53 | 30 | 0.3 | 2.5 |
| Cr | 900 | 3.1 | 2.50 | 120 | 2.0 | 4.3 |
| Cr | 900 | 3.1 | 2.45 | 360 | 1.5 | 1.1 |
| Cr | 1,000 | 3.1 | 2.05 | 10 | 0.2 | 5.4 |
| Cr | 1,000 | 3.1 | 1.90 | 30 | 0.8 | 7.7 |
| Cr | 1,000 | 3.1 | 1.88 | 120 | 1.5 | 3.2 |
| Cr | 1,000 | 3.1 | 1.80 | 360 | 3.2 | 4.3 |
| Cr | 1,100 | 3.1 | 0.92 | 10 | 0.4 | 9.2 |
| Cr | 1,100 | 3.0 | 1.05 | 30 | 0.9 | 7.5 |
| Cr | 1,100 | 3.1 | 1.25 | 120 | 0.9 | 1.9 |
| Cr | 1,100 | 3.0 | 1.02 | 360 | 1.5 | 1.1 |
| Ni | 1,000 | 1.7 | 2.25 | 30 | 1.4 | 4.6 |
| Ni | 950 | 16.6 | 3.6 | 35 | 5.8 | 2.0 |
| Ni | 1,000 | 15.5 | 2.7 | 35 | 0.9 | 2.0 |

Sample cathodes were immersed in the fused lithium fluoride bath at different temperatures and for periods up to 30 minutes, with no applied voltage, using a carbon anode. None of the samples showed any weight gain nor had any surface coating, thus demonstrating that lithium was introduced into the samples only under the influence of an electro-potential.

It will, of course, be apparent to those skilled in the art that modifications other than those set forth in the above examples can be employed in the process of this invention without departing from the scope thereof.

What I claim as new and desire to secure by Letters Patent of the United States is:

1. A method of forming a lithide coating on a metal composition having a melting point greater than 850° C., at least 1 mole percent of said metal composition being a metal in which lithium is soluble, said method comprising (1) forming an electric cell containing said metal composition as the cathode, joined through an external electrical circuit to a carbon or lithium anode and a fused salt electrolyte consisting essentially of lithium fluoride, said electrolyte being maintained at a temperature of at least 850° C., but below the melting point of said metal composition in the substantial absence of oxygen, (2) controlling the current flowing in said electric cell so that the current density of the cathode does not exceed 10 amperes/dm.² during the formation of the lithide coating, and (3) interrupting the flow of electrical current after the desired thickness of the lithide coating is formed on the base metal object.

2. The method of claim 1 wherein the absence of oxygen is obtained by use of a vacuum.

3. The method of claim 1 wherein the absence of oxygen is obtained by use of an inert gas in the cell.

4. The method of claim 1 wherein the cathode metal composition is a chromium-containing alloy.

5. The method of claim 1 wherein the cathode metal composition is chromium.

6. A method of claim 1 wherein the anode is lithium metal and wherein all of the electrical energy for the process is self-generated in the electric cell.

7. A method of claim 6 wherein part of the direct current is supplied by an external E.M.F. circuit impressed upon the electrical circuit.

8. The method of claim 1 wherein the cathode metal composition is nickel.

9. The method of claim 1 wherein the cathode metal composition is copper.

References Cited

UNITED STATES PATENTS

| Re. 25,630 | 8/1964 | Cook | 204—39 |
| 2,828,251 | 3/1958 | Sibert et al. | 204—39 |
| 3,024,175 | 3/1962 | Cook | 204—39 |
| 3,024,176 | 3/1962 | Cook | 204—39 |
| 3,232,853 | 2/1966 | Cook | 204—39 |
| 3,445,288 | 5/1969 | Buzzelli | 136—6 |

FOREIGN PATENTS

| 742,190 | 9/1966 | Canada. |

OTHER REFERENCES

J. Electrochemical Society, vol. 112, No. 3, 1965, pp. 266–272.

JOHN H. MACK, Primary Examiner

R. L. ANDREWS, Assistant Examiner